Dec. 15, 1925.　　　　　　　　　　　　　　　　1,565,965
E. F. SEISEL
WATER HEATER
Filed March 29, 1923　　　　2 Sheets-Sheet 1
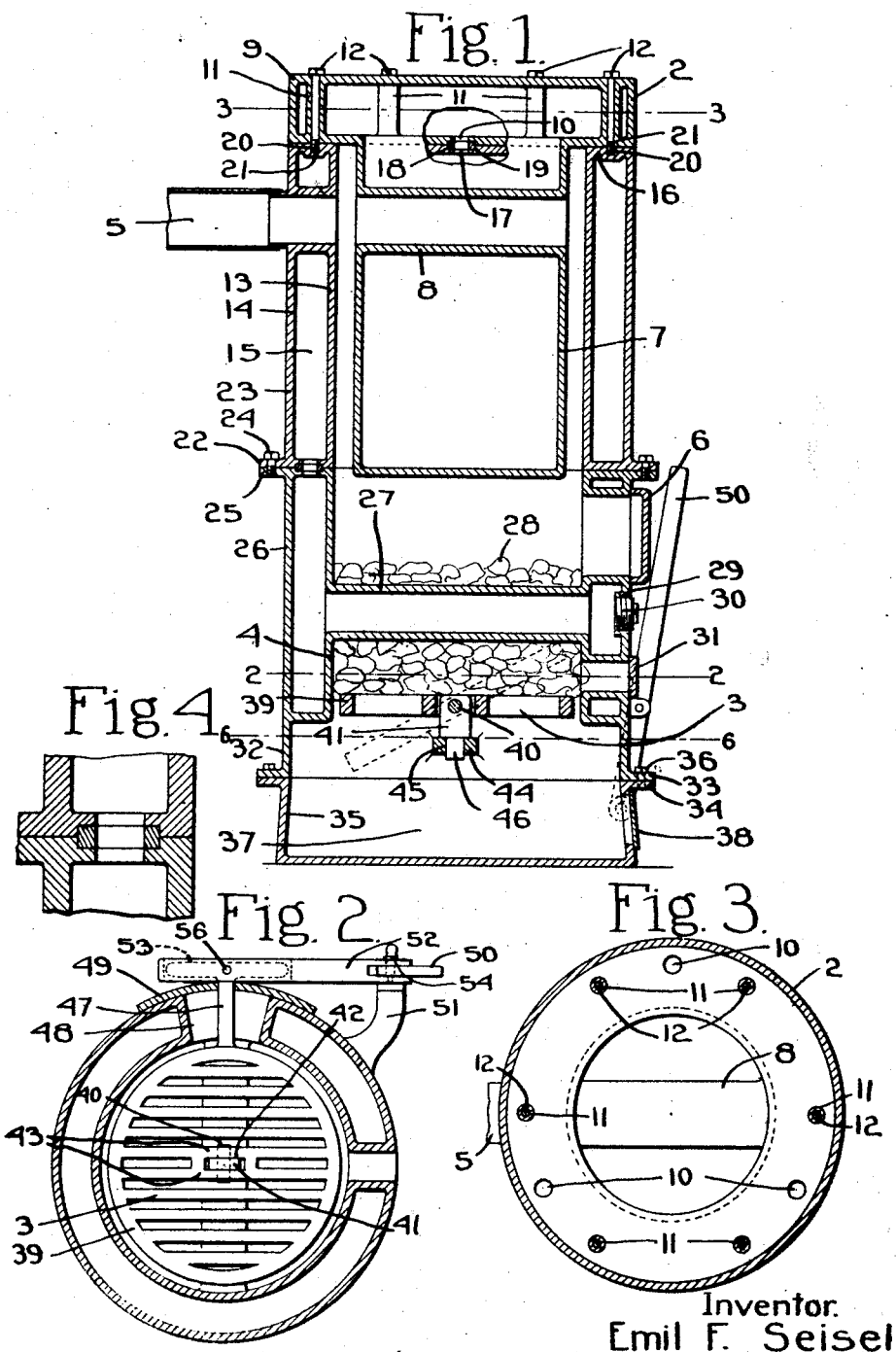
Inventor.
Emil F. Seisel
Attys.

Dec. 15, 1925.
E. F. SEISEL
WATER HEATER
Filed March 29, 1923
1,565,965
2 Sheets-Sheet 2
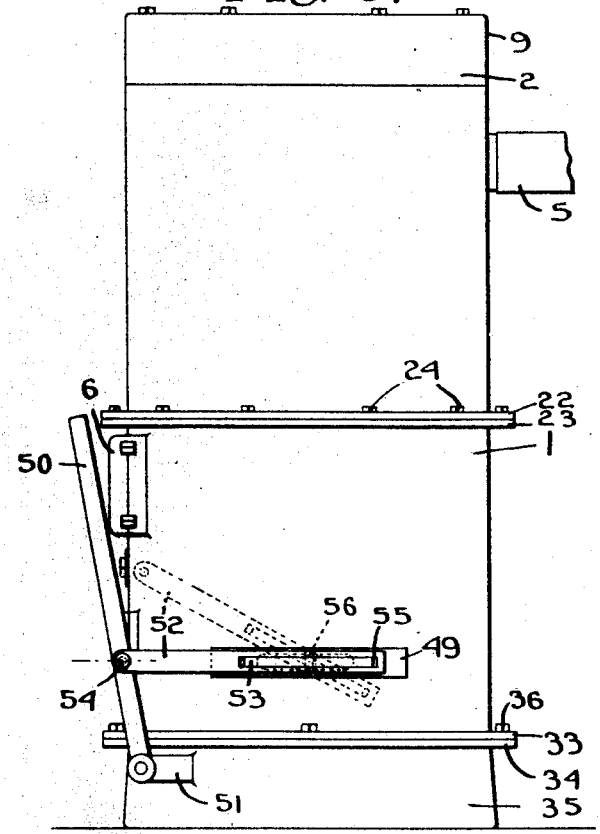
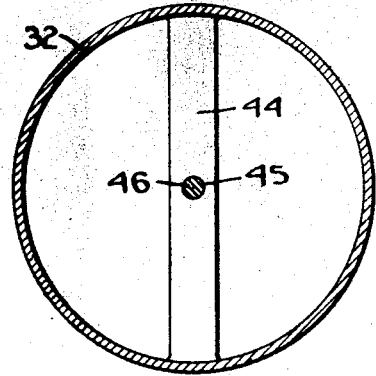
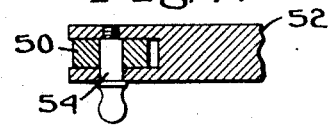
Inventor.
Emil F. Seisel
by Heard Smith & Tennant.
Attys.

Patented Dec. 15, 1925.

1,565,965

UNITED STATES PATENT OFFICE.

EMIL F. SEISEL, OF NORWOOD, MASSACHUSETTS.

WATER HEATER.

Application filed March 29, 1923. Serial No. 628,557.

*To all whom it may concern:*

Be it known that I, EMIL F. SEISEL, a citizen of the United States, and resident of Norwood, county of Norfolk, State of Massachusetts, have invented an Improvement in Water Heaters, of which the following description, in connection with the accompanying drawing, is a specification, like characters on the drawing representing like parts.

This invention relates to a water heater of the type used in producing steam or hot water and the object thereof is to produce such a water heater which is extremely economical in the consumption of fuel and which is easy to tend.

A further object of the present invention is more particularly to provide a water heater in which the water is at all points brought into as intimate contact as possible with the fuel or hot gases generated thereby.

A further object of the present invention is to provide a water heater with a hollow vertical drum for holding the water closely adjacent the fuel and with a fire tube through the drum.

A further object of the present invention is to provide a water heater having a water leg and a water tube joining the opposite portions of said water leg and adapted to be entirely surrounded by the fire.

A further object of the present invention is to provide a water heater having a grate which may be easily moved to shake the fire, or easily tilted to dump the fire.

A further object of the present invention is to provide a water heater with a grate having a novel means for supporting the grate.

Other objects and features of the invention will more fully appear from the following description and the accompanying drawings and will be particularly pointed out in the claim.

In the drawings:

Fig. 1 is a section longitudinally through the water heater from top to bottom.

Fig. 2 is a section on line 2—2 Fig. 1.

Fig. 3 is a section on line 3—3 Fig. 1.

Fig. 4 is a detail of the means for joining the water leg to the steam chamber.

Fig. 5 is a side elevation of the water heater.

Fig. 6 is a section on line 6—6 Fig. 1.

Fig. 7 is a detail of the means for joining the shaker bar to the link which actuates the grate.

The apparatus illustrated herein is designed to be used as a water heater to produce steam or hot water for use particularly in the heating of buildings. In the heaters now used for heating buildings the water is contained between the double walls of the heater and is also in the steam chamber of the heater which steam chamber is frequently spaced a considerable distance above the bed of burning fuel, and the grate is so arranged that when it is shaken to remove the ashes, the ashes fall through the center of the grate and leave a ring of ash around the fire-box thereby preventing the live coals from coming into intimate contact with the parts of the furnace which contain the water.

In the water heater of the present invention a drum which contains the water extends downwardly from the top of the heater to such a distance that its bottom is closely adjacent to the top of the fuel bed and the drum is spaced from the inner walls of the heater so that the hot gases in escaping from the heater come into intimate contact with the drum by passing around the side walls thereof and between the drum and inner walls of the water heater. A fire tube has been formed through the drum in order that the hot gases may pass through the drum and in more intimate contact with the walls thereof, and a water tube has been provided joining the opposite portions of the water leg and lying within the fuel bed so that the water in this tube is entirely surrounded by the hot coals.

A novel type of grate has been provided which when it is shaken permits the ashes to fall around the periphery of the grate and away from the walls of the water leg, and permits the live coals to take the place of the insulating ring of ash which builds up in the usual type of water heater adjacent the walls of the water leg. The grate has also been supported by novel means to permit it to be both shaken and dumped from the outside of the furnace.

As illustrated herein the water heater constituting the invention consists of a body portion 1, a head 2, adapted to rest on the body portion, and a grate 3 co-operating with the body portion to form therewith a fire-box 4. As is usual a flue 5 is provided through the body portion near the upper part thereof and a door 6 opens through the wall of the body portion into the fire-box.

The head has a hollow vertical drum 7 depending therefrom within the body portion to the level of the top of the feed door. A fire tube 8 is formed in the drum and extends through the drum from one side to the other so that one open end of the fire tube lies adjacent the flue 5. With this construction the bottom of the drum is as close to the fire as is possible and still permit fuel to be easily fed into the fire-box with the result that the bottom of the drum becomes highly heated and thus heats the water within the drum to a high degree. The hot gases from the burning fuel pass upwardly around the drum and out through the flue, and the fire tube 8 is formed through the drum in order that the hot gases will not be pocketed in the upper end of the space between the drum and the walls of the body but will easily escape and pass out of the flue in order that the drum will be evenly heated on all sides.

The head has a horizontal portion 9, which is of such a size that it extends well over the walls of the body portion as is shown in the drawing and is hollow forming a chamber which may be either a steam chamber, if the heater is to be used to generate steam, or a hot water reservoir in case the heater is to be used to heat water. Openings 10 are formed in the lower side of the horizontal portion of the head for communication with the water leg. Any number of openings may be made, but it is now deemed preferable to form only three equally spaced openings so that each opening will be certain to fit closely against the body portion even though the walls of any opening are thicker than the walls of the other openings. Sleeves 11 are made integral with the horizontal portion and extend therethrough to permit the passage of bolts 12 through the head to fasten the head to the body portion.

The body portion has double spaced walls 13 and 14 which form between them the water leg, 15. A web 16 joins said walls on the top and has openings 17 therethrough for communication with the openings 10 in the horizontal portion of the head in order to permit the passage of steam or water from the water leg into the head. In order to prevent the water or steam from leaking between the joining edges of the web and leg a gasket 18 is placed in pockets 19 having portions cut both in the web and in the head. These gaskets may be of any suitable material such as soft metal rings which will be mashed into shape and conform with the contour of the walls of the pockets when the head is tightened up against the web on the body portion. Recesses 20 are formed in the web for registry with the opening through the sleeves 11 and are preferably threaded to engage threads 21 cut on the lower end of the bolts 12 to retain the head on the body portion. Flanges 22 project from the walls of the upper part 23 of the body portion and bolts 24 extend therethrough for engagement with flanges 25 projecting from the lower part 26 of the body portion to hold together the upper and lower parts of the body portion.

A water tube 27 joins the water leg on the lower part 26 of the body portion and lies within the fire-box 4. The tube is thus placed so that it will be entirely surrounded by the fuel 28 and will serve as a deflecting means to force the fresh fuel over toward the sides of the fire-box so that when it burns the heat will be generated closely adjacent to the water leg where it will best heat the water. An opening 29 is made through the outer wall of the body portion to permit the withdrawal of the core when the lower part of the body is cast and permit access to the water tube for cleaning purposes after the water heater has been set up. This opening is closed in any convenient manner as by a plug 30. A small door 31 may conveniently be formed through the wall into the fire-box on a level with the grate 3 to provide access to the bottom of the fire-box for the removal of clinkers or foreign material which may collect on the grate. The lower part 26 is extended as shown at 32 as a single wall structure and flanges 33 are formed thereon for engagement with flanges 34 formed on the base 35 which supports the entire water heater. The flanges 33 and 34 may be held together by means of bolts 36 similar to the bolts 24 used in connection with the flanges 22 and 25 mentioned heretofore. The base also forms an ash pit 37 and a usual door 38 is formed therethrough to give access to the ash pit.

The grate 3 may be of any convenient construction but is preferably of the form shown in the drawings with its periphery 39 spaced slightly from the inner wall 13 of the body portion in order to permit the ashes to fall from the grate around the periphery thereof when the grate is shaken and to prevent the collection of ashes around the walls of the fire-box which in heaters of the usual construction form a heat insulating ring and keep the live coals of the fire from lying adjacent the walls of the water leg. The grate is preferably of one-piece construction and means are provided for mounting the grate at its center for rotation in a horizontal plane and for swinging movement in a vertical plane. Such means may conveniently be a horizontal pin 40 forming a journal connection between a support 41 and the grate. As shown in Figs. 1 and 2 the support extends upwardly into an opening 42 between two of the parallel grate bars 43 and the pin 40 extends through alined openings in both the grate bars and the support. A bar 44 extends across the ash pit below the grate as shown in Figs. 1 and 6 and a hole 45 is formed therethrough in which the support is mounted for horizontal rotation. The support may be mounted on the bar in any convenient manner as by a pin 46 which extends from the support and is adapted to be placed in the hole 45 to support the grate within the furnace and from a pivot about which the grate may rotate.

An arm 47 projects from the grate through an opening 48 formed through the walls of the heater and serves as a means by which the grate may be rotated for shaking and swung for dumping. A plate 49 or other means is used to close the opening so that drafts of air are not permitted either to enter the ash pit or to escape therefrom. A shaker bar 50 is pivoted at one end to any convenient projection of the heater, such as an arm 51 formed on the base 35, and a link 52 connects the bar with the end 53 of the grate arm 47. The link 52 is removably connected to the shaker bar 50 by means of a pin 54 in order that when it is desired to dump the grate the shaker bar and link may be disconnected and then the link moved in a vertical direction to tilt the grate into the position shown in dotted lines in Figs. 1 and 5. The end 53 of the grate arm may be enlarged, squared, or have any other form which will prevent the grate from tilting and dumping the fire except when the link 52 is moved. For this purpose the end 53 of the grate arm may conveniently be enlarged and elongated in a direction perpendicular to the arm and fit in the recess 55 formed in the end of the link adjacent the grate arm. The grate arm and link are removably connected to each other by a pin 56 in order that the grate may be moved from the furnace. With the structure thus described it will be seen that by grasping the upper end of the shaker bar and reciprocating it in a horizontal direction the grate and support may be rotated on the bar 44 about the pin 46 for shaking and when the link is disconnected from the shaker bar and given a vertical movement the grate may be swung about the pin 40 of the support 41 into the dotted line position shown in Figs. 1 and 5 for dumping.

It is obvious that the water heater may be made in any convenient manner and of any suitable material, and although a particular form of the invention has been described changes may be made without departing from the spirit of the invention. It is therefore desired that the invention be construed as broadly as the limitations in the claim taken in conjunction with the prior art, may allow.

Having thus described the invention, what is claimed as new, and desired to be secured by Letters Patent, is:—

A heater comprising a body portion provided with double walls forming between them a water leg, the lower portion of the body constituting a fire-box, said body having a fire-door opening into the fire-box, a single water tube extending centrally across the fire-box below the fire-door and communicating at each end with the water leg, said walls of the body at their upper ends being connected by a web, a hollow head resting on and secured to said web and closing the upper part of the body, said head having integral therewith a drum which depends into the body portion to about the top of the fire-door, said web and the portion of the head resting thereon having aligned apertures therethrough to provide for circulation, said body having a flue opening in one wall near the top, and a flue extending through the drum in line with said opening.

In testimony whereof I have signed my name to this specification.

EMIL F. SEISEL.